United States Patent [19]

Cousin

[11] Patent Number: 5,382,855
[45] Date of Patent: Jan. 17, 1995

[54] ELECTRIC DRIVE MOTOR WITH INTERCHANGEABLY-MOUNTED CONNECTOR

[75] Inventor: Joël Cousin, Nevers, France

[73] Assignee: Societe Electromecanique du Nivernais-Selni, Nevers, France

[21] Appl. No.: 923,890

[22] PCT Filed: Dec. 17, 1991

[86] PCT No.: PCT/FR91/01022
§ 371 Date: Jan. 29, 1993
§ 102(e) Date: Jan. 29, 1993

[87] PCT Pub. No.: WO92/11683
PCT Pub. Date: Jul. 9, 1992

[30] Foreign Application Priority Data
Dec. 12, 1990 [FR] France ............... 90 16133

[51] Int. Cl.$^6$ .................... H02K 5/22; H02K 5/26
[52] U.S. Cl. ........................ 310/71; 310/43; 310/85
[58] Field of Search .......... 310/71, 85, 88, 89, 310/254, 43, 60 R, 68 C

[56] References Cited

U.S. PATENT DOCUMENTS

| | | | |
|---|---|---|---|
| 4,866,317 | 9/1989 | Katayama | 310/89 |
| 5,073,735 | 12/1991 | Takagi | 310/71 |
| 5,134,327 | 7/1992 | Sumi et al. | 310/43 |
| 5,164,625 | 11/1992 | Hofmann et al. | 310/88 |
| 5,220,224 | 6/1993 | Bosman et al. | 310/49 R |

FOREIGN PATENT DOCUMENTS

| | | |
|---|---|---|
| 2312133 | 12/1976 | France . |
| 2552595 | 3/1985 | France . |
| 2580424 | 10/1986 | France . |
| 8633206 | 2/1987 | Germany . |

Primary Examiner—Steven L. Stephan
Assistant Examiner—D. R. Haszko
Attorney, Agent, or Firm—Meltzer, Lippe, Goldstein, Wolf, Schlissel & Sazer

[57] ABSTRACT

Device equipped with an electric drive motor (3) and with a body (2) on which a stator of this motor is mounted, characterized in that it comprises a casing (10) immovably attached to said stator (5, 6) and constituting together with the latter an autonomous statoric sub-assembly (13) which is protected against outside aggression and is provided with two diametrically opposed mounting tracks to mount said autonomous statoric sub-assembly (13) on said body (2), one track making it possible to orient the electrical connection terminals or pins (11) of a electric winding (6) of this stator towards the forward section of the device and one track making it possible to orient them towards the rear of this device.

18 Claims, 4 Drawing Sheets

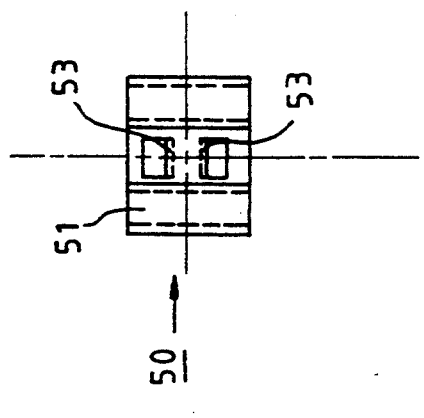
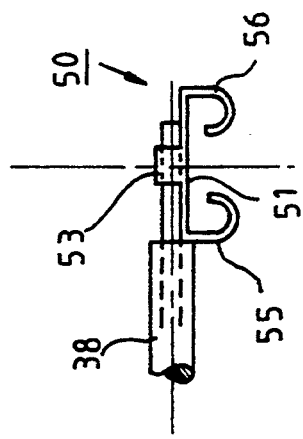
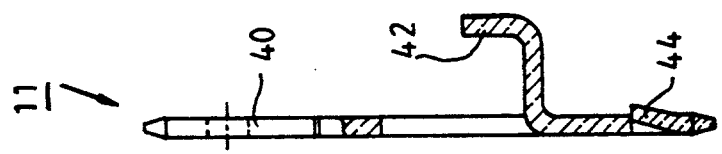
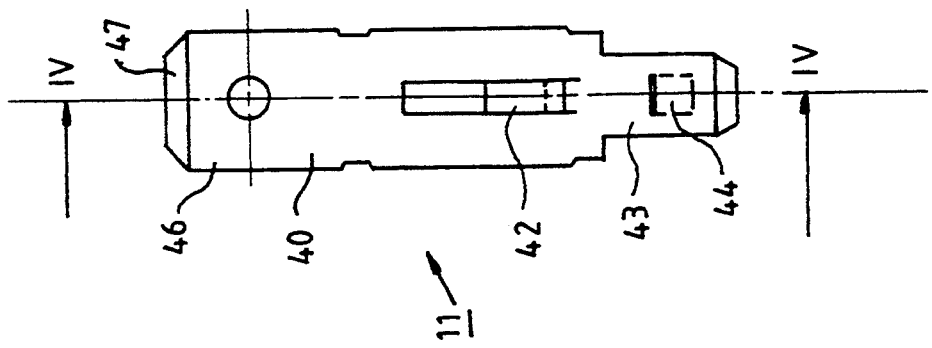

ELECTRIC DRIVE MOTOR WITH INTERCHANGEABLY-MOUNTED CONNECTOR

FIELD OF THE INVENTION

The instant invention relates to a device equipped with an electric drive motor.

BACKGROUND OF THE INVENTION

In a device of known manufacture such as an electric pump, the electric drive motor comprises in general a rotor with permanent magnets supported by the body of the device and, furthermore, a stator comprising a core of U-shaped electric sheets, an electric winding consisting either of one single electric wire coil mounted on the mid-section of the U of this magnetic core or of two wire coils in series mounted on the two branches of the U of this magnetic core and a protection hood. The electric winding is provided with electric connection terminals or pins. In assembling the device the fragile winding of the stator is often protected by a hood, only at the end of the operation.

Upon demand the device is often supplied with electric connection terminals or pins oriented either towards the front or the rear of the device and positioned according to a conventional standard or to some other standard.

To meet customer requirements, the known device is normally manufactured with different configurations of body and protection hood, thereby increasing its cost and necessitating costly storage of these parts.

The instant invention which has as its object to avoid these disadvantages makes it possible to produce a device with an electric drive motor at a reasonable price.

SUMMARY OF THE INVENTION

According to the invention this device is given only one body form and only one form for the protective casing for the electric winding of the drive motor and is thus able to meet different specifications with respect to the orientation of the electric connection terminals towards the front or towards the rear and their positioning according to an established standard or some other standard.

This device is provided with a structure which facilitates the automation or robotization of the assembly and/or of the manufacture of several of these elements.

According to the invention, a device equipped with an electric drive motor and with a body on which a stator of this motor is mounted is characterized in that it comprises a casing which is immovably attached to the stator, constitutes with the stater an integral statoric sub-assembly which is protected against external forces or actions. The casing is provided with two diametrically opposed tracks to mount the integral statoric sub-assembly on the body, one track making it possible to orient the electric connection terminals or pins of a winding of the stator towards the front of the device, and one track making it possible to orient it towards the rear of the device.

BRIEF DESCRIPTION OF THE DRAWINGS

To facilitate the comprehension of the invention, an the invention is described below through drawings in which:

FIG. 3 shows a schematic top view of an electric connection terminal or pin of the stator winding;

FIG. 4 shows a partial section along line IV–VI of the electric connection terminal or pin of FIG. 3;

FIG. 5 shows a top view of an electric connection pod of a thermal stator winding protector;

FIG. 6 shows an end view of the electric connection pod of FIG. 5;

DETAILED DESCRIPTION OF THE INVENTION

Figure 1:
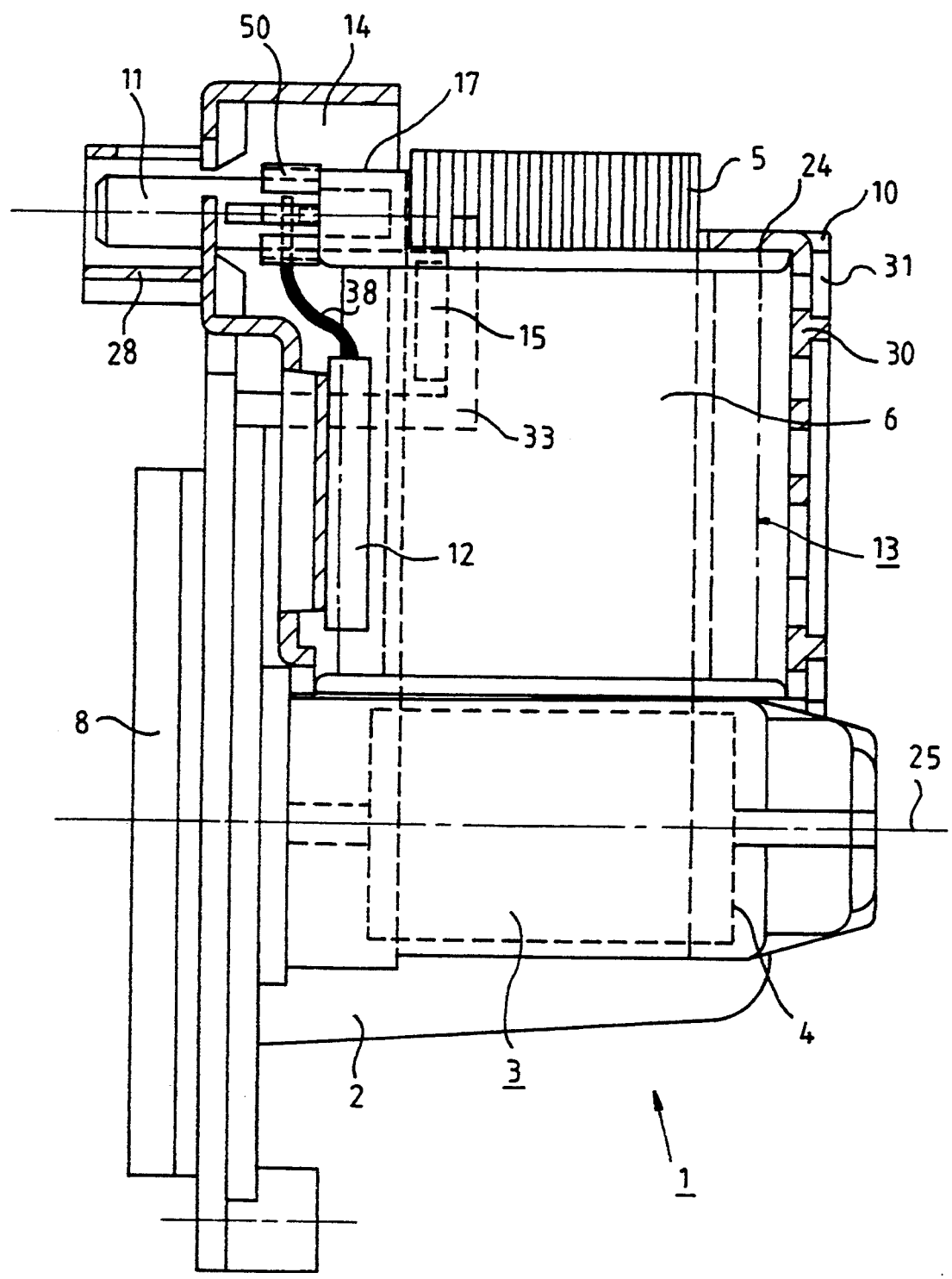
FIG. 1 shows a partial schematic view of a section through a device with an electric drive motor in the form of an electric pump showing a body of the device and an integral statoric sub-assembly of this drive motor having electric connection terminals or pins oriented towards the front of the device.
Figure 2:
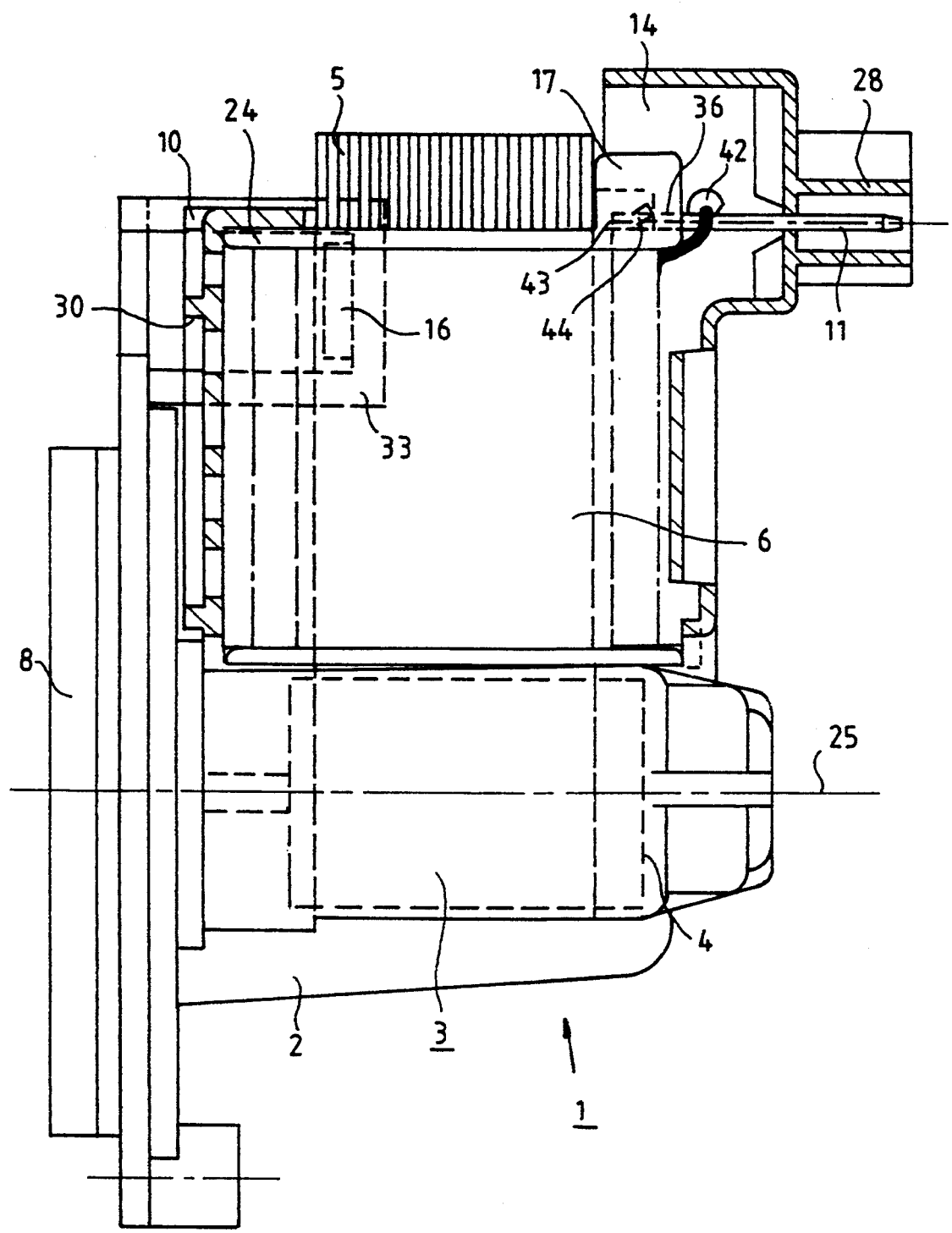
FIG. 2 shows a partial schematic view of a section through a device equipped with a drive motor in the form of an electric pump showing a device body that is identical to that of FIG. 1 and an integral statoric sub-assembly of the drive motor identical to that of FIG. 1 but having electric connection terminals or pins oriented towards the rear of this device.

A device equipped with an electric drive motor such as an electric motor pump 1, as illustrated schematically in FIGS. 1 and 2, comprises a body 2, an electric drive motor 3 of the type using a permanent magnet rotor 4 and with a stator consisting of a core 5 of U-shaped magnetic sheets and of an electric winding 6.

In the example shown, the rotor 4 which is supported in rotation by body 2 drives a fly wheel (not shown) of a pump 8 mounted in the forward section of the device 1, and the stator with its electric winding 6 is mounted astride body 2 around this rotor 4.

According to invention, a device equipped with an electric drive motor 1 comprises, a casing 10 which is immovably attached to the stator and constitutes together with the stator, an integral statoric sub-assembly 13 which is protected against external forces by this casing 10. The casing 10 is provided with two diametrically opposed tracks for the assembly of the integral statoric sub-assembly on the body 2 of device 1: one track making it possible to orient the electrical connection terminals or pins 11 of winding 6 towards the forward section of the device 1 (FIG. 1) and one track making it possible to orient the electrical connection terminals or pins towards the rear section of the device 1 (FIG. 2).

The integral statoric sub-assembly 13 comprises the casing 10, the magnetic U-shaped core 5, the electric winding 6 protected against external forces by this envelope or using 10, an optional thermal protector 12, a multi-standard electric connector 14 and mechanical means to fasten the integral statoric sub-assembly on the body 2 of device 1, as well as symmetric lateral forward and rear attachment bushings 15 and 16 supported by casing 10.

In the integral statoric sub-assembly the electric wiring is constituted either by one single coil of electric wire (not shown) mounted on the mid-section or the bottom of the U or on a branch of the U of the magnetic core b, or by two paired coils 19, 20 of electric wire in series, which are illustrated schematically in FIGS. 7 to 10, mounted on the two branches of the U of this magnetic core 5.

A known optional thermal protector 12 is positioned preferably in an existing available space between the two paired coils 19, 20 of the winding 6.

A multi-standard electric connector 14 comprises on the one hand the electric connection terminals or pins 11 of the electric winding 6 and/or of the thermal protector 12 attached in a projection 17 of a cheek 24 of a coil (not shown) or in projections 17 of electrically insulated adjacent cheeks 24 of paired coils 19, 29, Those cheeks are the furthest away from the axis 25 of the body 2 of device 1, i.e. adjacent to the bottom of the U of the magnetic core 5, so that they can be removed from body 2 of the device 1 without any spatial interference between the body 2 and the multi-standard electric connector 14. On the other hand, the multi-shaped electric connector 14 comprises sliding guides 28 formed on one end projecting from the casing 10 for female electrical connection plugs of a known type, and not shown here, which are plugged into the electrical connection terminals or pins 11.

The casing 10 is made of an electrically insulating material that is resistant to mechanical shocks. The casing 10 simultaneously the electric winding 6 and the electrical connection terminals or pins 11 and protects them. The casing 10 comprises a vented cover 30 mounted on its walls 31 and pivoting on hinges, not shown, or removable by an interlocking assembly. This vented cover allows a stator-cooling air stream to go through.

The integral statoric sub-assembly 13, with its two opposite tracks for installation on body 2 of the device, makes it possible to easily meet the different requirements of orientation of electrical connection terminals or pins 11 towards the front or the rear of the device 1. The symmetric lateral forward and rear fastening bushings, respectively 15 and 16, supported by envelope 10 and make it possible to retain and immobilize the integral statoric sub-assembly 13 in its place on body 2 of the device by catching on associated lugs 33 on the body 2. The device 1 is thus especially economic in manufacture and advantageous in storage because it has one single form of body 2 of the device 1 and one single form of the casing 10 of the integral statoric sub-assembly 13. These single forms make it possible for this device 1 to meet the demands regarding the orientation of the electrical connection terminals or pins 11 towards the front or towards the rear.

In the example illustrated in FIGS. 1, 2 and 7 to 10, the multi-standard electric connector 14 is made according to two standards, one a conventional standard and another standard known under the designation "RAST5". In the multi-standard electric connector 14 the electrical connection terminals or pins constituting input terminals or pins E and output terminals or pins S are flat and have, on the one hand predetermined tolerances that are relatively small for standard "RAST5" (FIGS. 8 and 10) and relatively large for the conventional standard (FIGS. 7 and 9) and are, on the other hand, laid out so as to be parallel and in a horizontal position according to the conventional standard and parallel and on edge according to the "RAST5" standard.

In a known manufacturing method, a first end of the electric winding 6 is welded to a known terminal to which a first electric feed wire of the thermal protector 12 is also welded. In this known method, the first end of the electric: winding 6 is heated up twice consecutively in a possibly damaging manner for welding.

According to the instant invention the multi-standard electric connector 14 of device 1 comprises, on the one hand, in one or several projections 17 of cheeks 24 adjacent to the paired coils 19, 20 of the electric winding 6 four identical holes or slits 36 positioned two by two according to the two standards, e.g. one conventional standard and one "RAST5" standard. The holes or slits 36 receive and fasten electrical connection terminals or pins 11. On the other hand, the multi-standard electric connector 14 comprises three identical electrical connection terminals or pins 11, the first two terminals of which being respectively connected to the two ends 34, 35 of the electric winding 6 (FIGS. 7 to 10) and the third terminal being connected to the first wire 38 of the two feed wires 38, 39 of an optional thermal protector 12, if the association of the thermal protector 12 with the electric winding 6 is stipulated (FIGS. 9 and 10), the second feed wire 39 of this thermal protector 12 being connected to one of these two first electrical connection terminals or pins 11.

Figure 7:
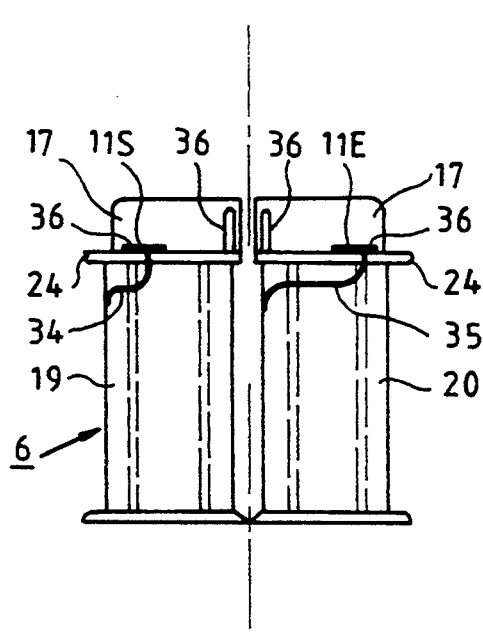
FIG. 7 shows a frontal view of a U-shaped stator winding made up of two electric wire coils in series and equipped with electric connection terminals or pins positioned according to an established standard.
Figure 8:
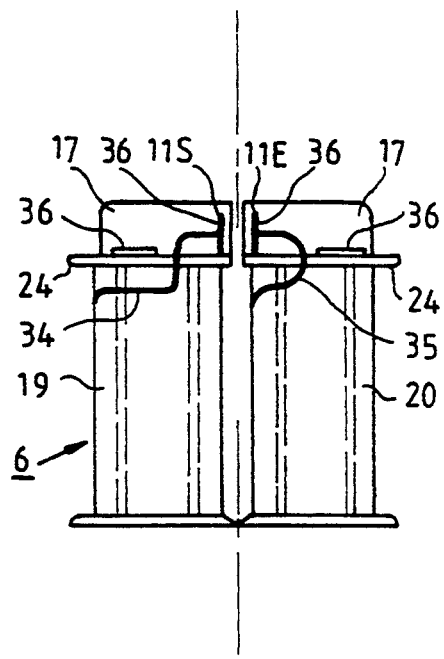
FIG. 8 shows a frontal view of a U-shaped stator winding made up of two electric wire coils in series and equipped with electric connection terminals or pins positioned in accordance with a "RAST5" standard.

If no thermal protector 12 is present in the integral statoric sub-assembly 13, the two first electrical connection terminals or pins 11, respectively connected to the two ends 34, 35 of the electric winding 6 and installed in two openings or slits 36 of the projections 17 of the cheeks 24 of the paired coils 19, 20 constitute, in the multi-standard electric connector 14 electrical input connection terminals or pins 11E and electrical output connection terminals or pins 11S in accordance with a conventional standard as shown in FIG. 7 and according to a "RAST5" standard as shown in FIG. 8.

Figure 9:
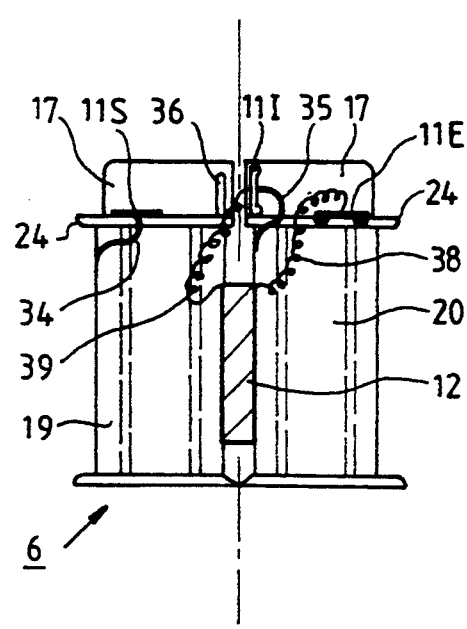
FIG. 9 shows a frontal view of a U-shaped stator winding made up of two electric wire coils in series protected by a thermal protector and provided with electric connection terminals or pins positioned in accordance with a conventional standard.
Figure 10:
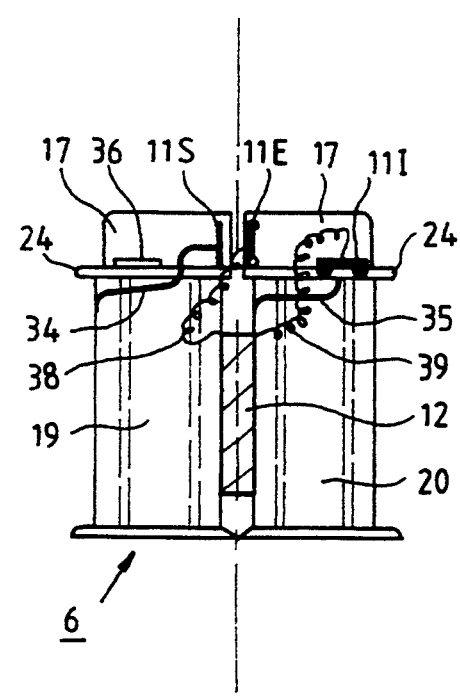
FIG. 10 shows a frontal view of a U-shaped stator winding made up of two electric wire coils in series protected by a thermal protector and provided with electric connection terminals or pins positioned in accordance with a "RAST5" standard.

If the presence of a thermal protector 12 in the integral statoric sub-assembly 13 is stipulated one of the first two electrical connection terminals or pins 11 connected to the first end 34 of ends 34, 35 or the electric winding 6 which is mounted in an opening or slit 36 of projections 17 of cheeks 24 of the paired windings 19, 20 and the third electrical connection terminal or pin 11 connected to the first feed wire 38 of the two feed wires of the thermal protector 12 and mounted in another opening or slit 36 of the projections 17 of the cheeks 24 of the paired windings 19, 20 constitute in, the multi-standard electric connector 14, electrical output connection terminals or pins 11S and input connections 11E according to a conventional standard as shown in FIG. 9 and according to a "RAST5" standard as shown in FIG. 10. Meanwhile, the other one of the first two electrical connection terminals or pins 11, which is connected, on the one hand, to the second end 35 of the electric winding 6 and on the other hand to the second wire 39 of the two feed wires 38, 39 of this thermal protector 12 and mounted in a third opening or slit 36 of these projections 17 of cheeks 24 of paired windings 19, 20, constitutes an intermediary connection terminal or pin 11I in series with the electric windings 6.

In the embodiment illustrated in FIGS. 3 and 4, an electrical connection terminal or pin 11 made of an elastic and mechanically resistant metal has a flat body 40 which is provided in its central area with a cut-out and raised tongue 42, in a first end or fastening end 43 with a cut-out and raised blocking tappet 44, and in a second end or connection end 46 with a bevelled point.

The tongue 42 is ready for fastening to an end of an electric winding 6 by welding or saddle joint. The tappet 44 serves to immobilize the flat body 40, i.e., the terminal or pin 11, when its fastening end 43 is completely engaged in a slit or opening 36 of the projections 7 of cheeks 24 of paired windings 19, 20 (FIG. 2).

The bevelled point 47 facilitates reception of a female electrical connection.

According to the invention, pods or clips 50 in the electric multi-standard connector 14 of the integral statoric sub-assembly 13 ensure an electric connection between the two feed wires 38, 39 of a thermal protector 12 and the electrical connection terminals or pins 11 by insertion or bayonet plug-in connection into the latter.

A pod or clip 50, made of an elastic and mechanically resistant metal. The clip 50 comprises a flat body 51 provided in its central part with cut-out and raised tappets 53 used for welded or saddle-joint or crimping fastening of one of the two lead wires 38, 39 of the thermal protector 12 and in its longitudinal edges with lateral tabs 55, 56 bent towards the inside. When the pod or clip 50 is joined or bayonet-plugged to a connection terminal or pin 11 of the electric connector 14, lateral bent tabs 55, 56 push and elastically apply the flat body 40 of that connection terminal or pin 11 against the flat body 51 of that pod or clip 50, thus achieving good electrical connection contact.

According to this process, the two feed wires of a thermal protector 12 are first fastened respectively on two pods or clips 50. When this thermal protector is plugged in, these pods or clips 50 are bayonet-plugged or force-joined to the connection terminals or pins 11 of the multi-standard electric connector 14. All these operations can be automated easily and advantageously, or can be robotized.

Since the thermal protector 12 in the integral statoric sub-assembly 13 is normally plugged in electrically in series with an electric winding 6 of the stator, it suffices then first to join the first of these two pods or clips 50 connected to the thermal protector 12 to a connection terminal or pin 11 of the multi-standard electric connector 14 which supports the first of the two ends of the electric winding 6 of the stator, and to consequently transform this connection terminal or pin into an intermediate connection terminal or pin 11I, second, to join the second of these two pods or clips 50 to a terminal or pin 11 that is free of all electric connection with the electric winding 6 and to transform this terminal or pin into an input connection terminal or pin 11E; and third, to install the connection terminal or pin 11 supporting the second one of the two ends of the electric winding 6 of the stator in the multi-standard electric connector 14 and to transform it into an output connection terminal or pin 11S (FIGS. 9 and 10. All these operations can also be easily and advantageously automated or robotized.

At the level of the intermediate connection terminal or pin 11I the pod or clip 50 joined to or inserted into the terminal or pin 11 makes it possible to avoid inflicting two consecutive and possibly damaging heating phases upon an electric winding 6 of a stator in an electric series connection of a thermal protector 12 and to that electric winding 6 through welding while facilitating automation or robotization of these operations.

I claim:

1. A device equipped with a body and an electric drive motor, said electric drive motor having a stator and a rotor, wherein said rotor is housed in said body, and said stator forms an integral stator assembly, said assembly comprising:

at least one cheek on which a wire is wound, an electric winding formed by at least one coil of said wound wire having two ends, a plurality of pins, wherein said cheek has a plurality of projections at one end for supporting said plurality of pins, whereby the electrical winding is connected to at least two of said plurality of pins, a magnetic core positioned at least partially in said winding, an envelope made of an electrically insulative material for mechanically protecting and electrically insulating said stator assembly, wherein said envelope encloses said cheek and said winding, and a connector formed from a part of said envelope, which connector surrounds said plurality of pins and said plurality of projections, wherein said envelope has a shape which allows said stator assembly to be selectively mounted on said body in either of two different directions, one direction wherein said connector faces a forward section of the device and another direction wherein said connector faces a rear section of the device.

2. The device according to claim 1, wherein said part of said envelope is preferably an upper part.

3. The device according to claim 1, wherein said stator assembly further comprises fastening means to fasten said stator assembly to said body.

4. The device according to claim 3, wherein said stator assembly further comprises a thermal protector having first and second feed wires and fastened to at least one of said plurality of projections and said envelope further surrounds said thermal protector.

5. The device according to claim 4, wherein said electric winding comprises two coils of electric wire and said thermal protector is placed between said two coils.

6. The device of claim 4, wherein said envelope simultaneously covers said electric winding and said pins and wherein said stator assembly further comprises a vented cover which allows an air current to cool said stator.

7. The device of claim 6, wherein said fastening means comprises rear and forward attachment bushings.

8. The device of claim 3, wherein said connector further comprises said plurality of pins fastened to at least one of said projections, wherein said at least one of said projections is located furthest from the axis of said body, and sliding guides for female electrical connection plugs joined to said pins.

9. The device as in claim 4, wherein said connector comprises four identical openings positioned two by two in the projections of said cheeks of said electrical winding, wherein said openings receive and hold said pins, and said plurality of pins comprises three identical pins, wherein a first identical pin is connected to two ends of said winding thereby forming an output connection pin, a third identical pin is connected to said first feed wire of said thermal protector when installation of said thermal connector is required, thereby forming an input connection pin and a second feed wire of said thermal protector is connected to a second identical pin thereby forming an intermediate connection pin.

10. The device of claim 9, wherein said openings are positioned according to one of two standards, conventional or RAST 5.

11. The device of claim 8, wherein each of said plurality of pins further comprises a flat body having first and second ends and a central area, a cut-out and raised tongue in said central area for holding one end of said of electrical winding, a cut-out and raised tappet in said first end for immobilizing said flat body, and a bevelled point on said second end which facilitates reception of a female electrical connection plug.

12. The device of claim 9, wherein said connector comprises pods which establish an electric connection between said two feed wires of said thermal protector and said pins.

13. The device of claim 9, wherein said connector comprises clips which establish an electric connection between said two feed wires of said thermal protector and said pins.

14. The device of claim 12, wherein one of said pods comprises a flat body having a central area, a plurality of cut-out and raised tappets at the central area to fasten one of said feed wires of said thermal protector, and a plurality of lateral tabs bent inwardly on said pod.

15. The device of claim 11, wherein one of said clips comprises a flat body having a central area, a plurality of cut-out and raised tappets at the central area to fasten one of said feed wires of said thermal protector, and plurality of lateral tabs bent inwardly on said clip.

16. The device of claim 1, wherein said electrically insulated material is resistant to mechanical shock.

17. The device of claim 14, wherein said pins and said pods are made of an elastic and mechanically resistant metal.

18. The device of claim 15, wherein said pins and said clips are made of an elastic and mechanically resistant metal.

* * * * *